(12) United States Patent
Kim

(10) Patent No.: US 8,210,326 B2
(45) Date of Patent: Jul. 3, 2012

(54) ELECTRONIC PARKING BRAKE APPARATUS

(75) Inventor: In Su Kim, Hwangsung-si (KR)

(73) Assignee: Hyundai Motor Company, Seoul (KR)

( * ) Notice: Subject to any disclaimer, the term of this patent is extended or adjusted under 35 U.S.C. 154(b) by 481 days.

(21) Appl. No.: 12/370,333

(22) Filed: Feb. 12, 2009

(65) Prior Publication Data

US 2010/0078273 A1    Apr. 1, 2010

(30) Foreign Application Priority Data

Sep. 30, 2008  (KR) .................. 10-2008-0095956

(51) Int. Cl.
*F16D 65/14* (2006.01)

(52) U.S. Cl. .......... 188/158; 188/2 D; 188/156; 188/265

(58) Field of Classification Search .............. 188/2 D, 188/156, 157, 158, 265; 73/862.391, 862.392
See application file for complete search history.

(56) References Cited

U.S. PATENT DOCUMENTS

| | | | | |
|---|---|---|---|---|
| 5,590,744 | A * | 1/1997 | Belmond | 188/265 |
| 6,405,607 | B2 * | 6/2002 | Faigle et al. | 73/862.391 |
| 6,591,222 | B2 * | 7/2003 | Stiner | 702/173 |
| 6,609,595 | B2 | 8/2003 | Flynn et al. | |
| 2005/0189183 | A1 * | 9/2005 | Gil et al. | 188/2 D |
| 2007/0296269 | A1 * | 12/2007 | Jeon | 303/20 |
| 2008/0053761 | A1 * | 3/2008 | Yamamoto | 188/156 |
| 2008/0185235 | A1 * | 8/2008 | Suzuki | 188/1.11 E |

FOREIGN PATENT DOCUMENTS

| | | |
|---|---|---|
| JP | 2007-315478 A | 12/2007 |
| JP | 2008-032064 A | 2/2008 |
| JP | 2008-051195 A | 3/2008 |
| JP | 2008-068836 A | 3/2008 |
| KR | 10-0736473 B1 | 7/2007 |

OTHER PUBLICATIONS

Kyowa Electronic Instruments Co., Ltd., *Kyowa Measuring Instruments 2005-2006*, Cat. No. 901G-U62, Japan.

* cited by examiner

*Primary Examiner* — David Dunn
*Assistant Examiner* — Philip Gabler
(74) *Attorney, Agent, or Firm* — Morgan, Lewis & Bockius LLP

(57) ABSTRACT

An electronic parking brake apparatus may include a driving member coupled to and actuating a parking cable, a case in which the driving member is housed, a cable ferrule disposed outside the case and coupled to a portion of the parking cable therethrough, wherein the cable ferrule is biased toward the case by the parking cable when the driving member actuates the parking cable, and a sensing member interposed between the case and the cable ferrule and measuring tension of the parking cable.

16 Claims, 2 Drawing Sheets

ELECTRONIC PARKING BRAKE APPARATUS

CLAIM OF PRIORITY

The present application claims the benefit of Korean Patent Application Number 10-2008-0095956 filed Sep. 30, 2008, the entire contents of which are incorporated herein for all purposes by this reference.

BACKGROUND OF THE INVENTION

1. Field of the Invention

The present invention relates to an electronic parking brake apparatus, and more particularly, to an electronic parking brake apparatus, in which a sensor for measuring tension of a parking cable is implemented with a load cell based on a strain gauge, and is mounted on a cable ferrule, thereby reducing the length of the electronic parking brake apparatus.

2. Description of Related Art

In general, parking brakes for vehicles are used for stopping the vehicle or preventing movement of the vehicle during parking by a driver stepping on a parking brake pedal or pulling a parking brake lever. Recently an electronic parking brake (EPB) is used, which is operated by simple manipulation of a switch.

This EPB is configured so that, when a switch is pushed to drive a motor, a parking cable is pulled by rotation of the motor, and thereby generating a uniform braking force for each rear wheel. This EPB need measurement of the magnitude of tension of the parking cable pulled by the motor. To this end, the EPB measures force that is typically generated through variation in displacement of a spring, and precisely controls a locked state of the parking cable and a driving force of the motor on the basis of the measured force.

An EPB unit using a spring displacement sensor will be described below with reference to the accompanying drawings.

FIG. 1 illustrates the configuration of a conventional EPB unit on which a spring displacement sensor is mounted.

The EPB unit 100 includes an electronic control unit (ECU) 110 controlling a locking or unlocking force of a parking brake through power supplied by manipulation of a switch, a driving means 120 tightening or loosening the parking cable 140 manipulating a brake mechanism for rear wheels by means of driving of the EPB ECU 110, and a sensing unit 160 measuring tension of the parking cable 140 tightened or loosened by the driving means 120 and then sending the measured signal to the EPB ECU 110.

The EPB unit 100 also includes a motor 121 installed in a case 130 having a predetermined shape so as to run backwards or forwards according to the manipulation of the switch, a driving gear 122 rotatably engaged with a rotating shaft of the motor 121, and a movable nut 124 engaged with a screw 123 and generating a linear moving force so as to pull or loosen the parking cable 140 by means of rotation of the driving gear 122.

Here, the sensing unit 160 is configured so that an equalizer connecting shaft 162 thereof connected with the parking cable 140 cooperates with the movable nut 124, thereby causing a movable pressure member 163 therein to compress a spring 161.

At this time, a displacement sensor 164 such as a hall sensor located in the sensing unit 160 detects displacement of the movable pressure member 163 or the spring 161, and sends the detected value to a sensor ECU 170. Then, the sensor ECU 170 calculates a level of load, and then sends the calculated result to the EPB ECU 110. In this process, the tension of the parking cable 140 is measured when the parking cable 140 is pulled.

In this manner, length of the case 130 is increased in a longitudinal direction of the parking cable 140 due to additional length of the sensing unit 160 located therein, which has an adverse influence on a layout of the vehicle.

Further, the sensor ECU 170 sending the measured value to the EPB ECU 110 is attached on one side of the sensing unit 160, and thus moves together when the sensing unit 160 moves. Further, an interface 180 connected between the sensor ECU 170 and the EPB ECU 110 moves together when the sensing unit 160 moves. In this process, the interface 180 interferes with the interior of the case 130 to be shorted out or cut off.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an electronic parking brake (EPB) unit having a load cell, in which the load cell is mounted on a cable ferrule, thereby reducing the length of the electronic parking brake apparatus, and in which a sensor electronic control unit (ECU) is fixed to a case, thereby preventing an interface connecting the sensor ECU and an EPB ECU from being shorted out or cut out.

In an exemplary embodiment of the present invention, an electronic parking brake apparatus may include a driving member coupled to and actuating a parking cable, a case in which the driving member is housed, a cable ferrule disposed outside the case and coupled to a portion of the parking cable therethrough, wherein the cable ferrule is biased toward the case by the parking cable when the driving member actuates the parking cable, and/or a sensing member interposed between the case and the cable ferrule and measuring tension of the parking cable.

The sensing member may receive an external force when the parking cable is actuated to measure the tension of the parking cable. The external force may be a compression force.

The sensing member may be attached to a stationary member to fasten the sensing member between the case and the cable ferrule.

The sensing member maybe attached to the cable ferrule.

The sensing member may be attached to outer surface of the case.

The sensing member may include a weight sensor based on a strain gauge.

In another aspect of the present invention, the electronic parking brake apparatus may further include a parking brake electronic control unit installed in the case, and/or a sensor electronic control unit installed at a stationary member, and sending a value of the tension of the parking cable measured by the sensing member to the parking brake electronic control unit.

The stationary member is the case. The sensor electronic control unit may be attached to inner surface of the case.

The case may include a fastening nut, which allows the parking cable to pass through and move therethrough.

The sensing member may be interposed between the fastening nut and the cable ferrule.

The sensing member may be attached to the fastening nut.

The sensing member may be attached to a stationary member to fasten the sensing member between the fastening nut and the cable ferrule.

The sensing member may be attached to the cable ferrule.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
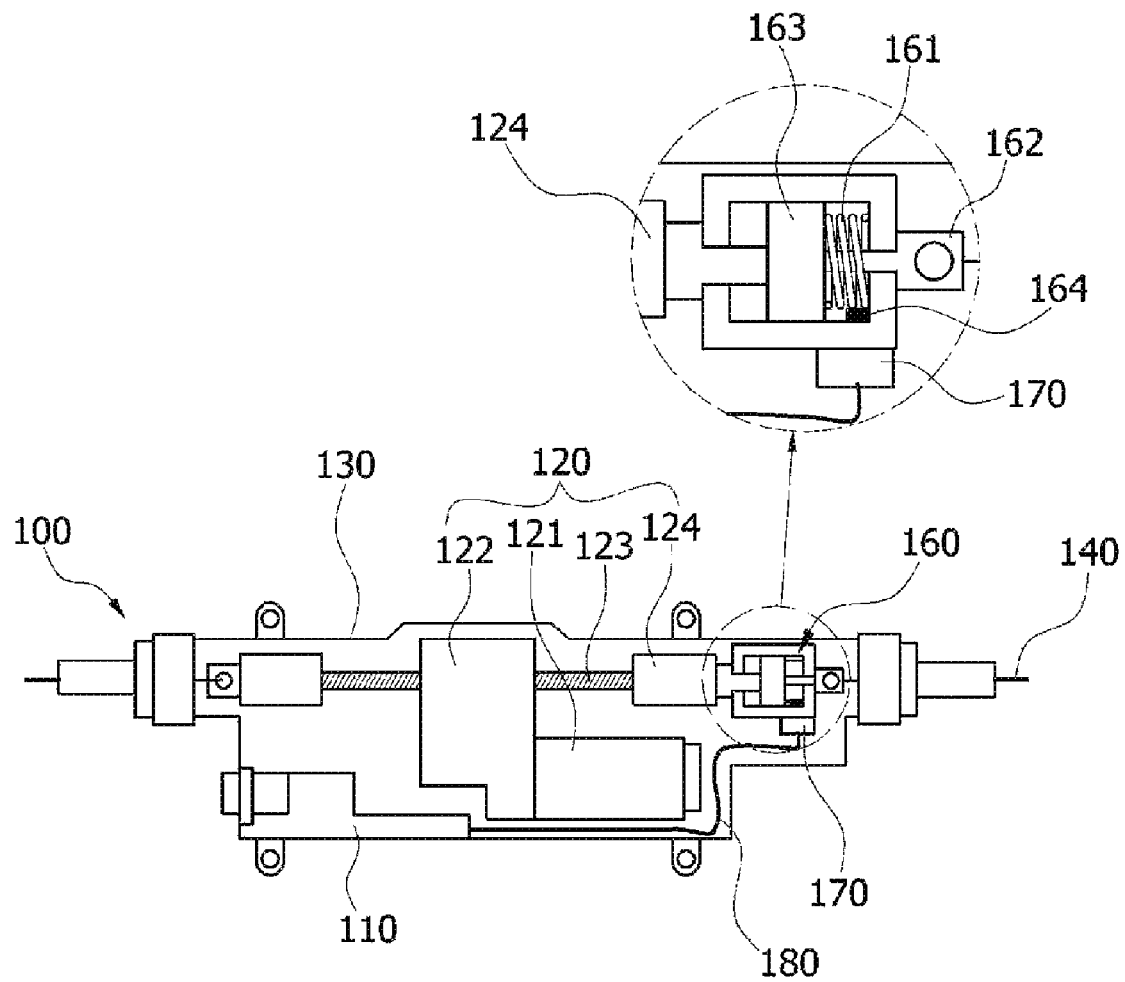
FIG. 1 illustrates the configuration of a conventional electronic parking brake (EPB) unit on which a spring displacement sensor is mounted.
Figure 2:
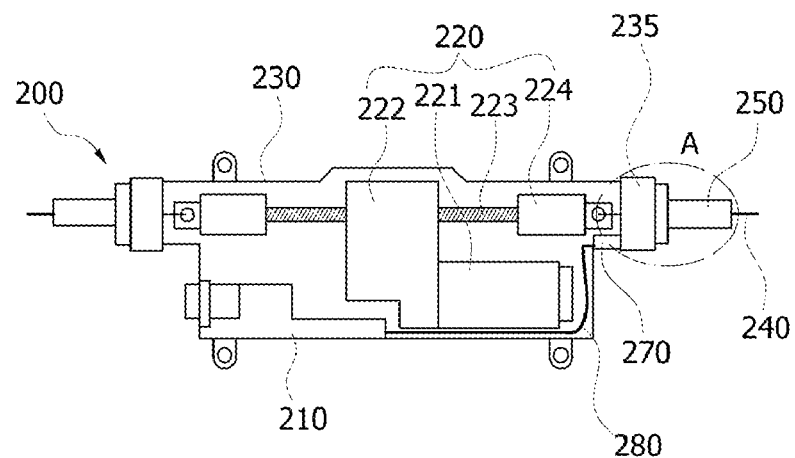
FIG. 2 illustrates the configuration of an exemplary EPB unit according to the present invention.
Figure 3:
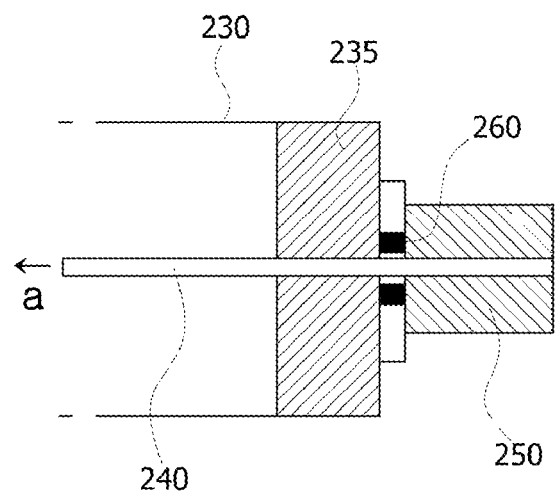
FIG. 3 is a cross-sectional view illustrating part A of FIG. 2.

FIG. 2 illustrates the configuration of an electronic parking brake (EPB) unit according to an exemplary embodiment of the present invention. FIG. 3 is a cross-sectional view illustrating part A of FIG. 2.

According to an exemplary embodiment of the present invention, the EPB unit 200 includes an EPB electronic control unit (ECU) 210 controlled by manipulation of a driver, a driving member 220 driven by the EPB ECU 210 and pulling or loosening a parking cable 240, and a sensor 260 measuring tension of the parking cable 240.

The EPB ECU 210 and the driving member 220 are installed in a case 230 having a predetermined shape, and opposite ends of the case 230 are closed by fastening nuts 235, in the center of each of which a hole into which the parking cable is inserted is formed.

The driving member 220 includes a driving motor 221 driven by the EPB ECU 210, a driving gear 222 operated by the driving motor 221, a screw 223 rotatably installed by the driving gear 222, and a movable nut 224 linearly moving along the screw 223.

The parking cable 240 is connected to one end of the movable nut 224 through the fastening nut 235. The parking cable 240 is connected to the movable nut 224 at one end thereof, and braking member of wheels at the other end thereof. Thereby, the parking cable 240 is pulled or loosened when the movable nut 224 linearly moves, and thus operates the braking member.

A cable ferrule 250 is coupled to the parking cable 240, wherein the cable ferrule 250 extends from the outside of the case 230, and is fixed to a bracket. This bracket is no more than a means for positional restriction, and thus undergoes minute deformation, because the cable ferrule 250 moves together when the parking cable 240 is displaced by the driving member 220.

The sensor 260 is a load cell based on a strain gauge, and is located between the fastening nut 235 and the cable ferrule 250.

In an exemplary embodiment of the present invention, the sensor 260 may be attached to the fastening nut 235 or the cable ferrule 250, and measures the tension of the parking cable 240. In another exemplary embodiment of the present invention, the sensor 260 may be attached to a stationary member that may fasten the sensor 260 between the fastening nut 235 and the cable ferrule 250.

In this manner, since the sensor 260 similar to the strain gauge is mounted on the cable ferrule 250 outside the case 230, and measures the tension of the parking cable 240. Thereby, a length of the case 230 can be reduced, which can be favorably applied to a layout of the vehicle.

In this state, when the EPB unit is operated, the parking cable 240 is pulled by the driving member 220. Thereby, the tension is applied to the parking cable 240 in the direction of an arrow "a." Due to this tension, the cable ferrule 250 attached to the parking cable 240 slightly moves in the direction of the arrow "a," and thus the sensor 260 attached to the cable ferrule 250 is pressed and thus subjected to a change in resistance. This resistance change is allowed to measure the tension of the parking cable 240.

Further, the measured value is sent to the EPB ECU 210 through a sensor ECU 270. The EPB ECU 210 and the sensor ECU 210 are connected with an interface 280.

Here, the sensor ECU 270 is fixed on one side of the interior of the case 230.

In this manner, because the sensor ECU 270 is fixed in the case 230, the interface 280 connected with the EPB ECU 210 does not move together with the sensor ECU 270 in the case 230, so that the interface 280 can be prevented from being shorted out or cut off.

For convenience in explanation and accurate definition in the appended claims, the terms "rear", "forward", and "backward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic parking brake apparatus, comprising:
    a driving member coupled to and actuating a parking cable;
    a case housing the driving member;
    a cable ferrule affixed around a portion of the parking cable and disposed outside the case, wherein the cable ferrule is biased toward the case by the parking cable when the driving member actuates the parking cable; and
    a sensing member disposed outside the case and between the case and the cable ferrule, the sensing member measuring tension of the parking cable based upon an axial force that the cable ferrule applies by pressing the sensing member against the case.

2. The electronic parking brake apparatus according to claim 1, wherein the sensing member receives an external force when the parking cable is actuated to measure the tension of the parking cable.

3. The electronic parking brake apparatus according to claim 2, wherein the external force is a compression force.

4. The electronic parking brake apparatus according to claim 1, wherein the sensing member is attached to a stationary member to fasten the sensing member between the case and the cable ferrule.

5. The electronic parking brake apparatus according to claim 1, wherein the sensing member is attached to the cable ferrule.

6. The electronic parking brake apparatus according to claim 1, wherein the sensing member is attached to outer surface of the case.

7. The electronic parking brake apparatus according to claim 1, wherein the sensing member includes a weight sensor based on a strain gauge.

8. The electronic parking brake apparatus according to claim 1, further comprising:
a parking brake electronic control unit installed in the case; and
a sensor electronic control unit directly installed at a stationary member, and sending a value of the tension of the parking cable measured by the sensing member to the parking brake electronic control unit.

9. The electronic parking brake apparatus according to claim 8, wherein the stationary member is the case.

10. The electronic parking brake apparatus according to claim 9, wherein the sensor electronic control unit is directly attached to inner surface of the case.

11. The electronic parking brake apparatus according to claim 1, wherein the case includes a fastening nut, which allows the parking cable to pass through and move therethrough.

12. The electronic parking brake apparatus according to claim 11, wherein the sensing member is interposed between the fastening nut and the cable ferrule.

13. The electronic parking brake apparatus according to claim 12, wherein the sensing member is attached to the fastening nut.

14. The electronic parking brake apparatus according to claim 12, wherein the sensing member is attached to a stationary member to fasten the sensing member between the fastening nut and the cable ferrule.

15. The electronic parking brake apparatus according to claim 12, wherein the sensing member is attached to the cable ferrule.

16. The electronic parking brake apparatus according to claim 1, wherein the cable ferrule is coupled to the parking cable and movable with a movement of the parking cable such that the cable ferrule is biased toward the case by the parking cable when the driving member actuates the parking cable.

* * * * *